No. 12,051. Reissued Nov. 4, 1902.

J. L. FIRM.

PRINTING PRESS.

(Application filed Oct. 3, 1902.)

3 Sheets—Sheet 1.

Witnesses:—

J. B. McGirr.

Walter W. Paulding

Inventor:—

Joseph L. Firm by Eggert & Bull

Attys

No. 12,051. Reissued Nov. 4, 1902.

J. L. FIRM.

PRINTING PRESS.

(Application filed Oct. 3, 1902.)

3 Sheets—Sheet 2.

Witnesses:-
J. B. McGirr.
Walter A. Paulding.

Inventor:-
Joseph L. Firm
by Gifford & Bailey
Attys.

No. 12,051. Reissued Nov. 4, 1902.

J. L. FIRM.

PRINTING PRESS.

(Application filed Oct. 3, 1902.)

3 Sheets—Sheet 3.

Witnesses:-
J. B. McGirr.
Walter A. Rawling

Inventor:-
Joseph L. Firm
by Effland & Bell
Attys

UNITED STATES PATENT OFFICE.

JOSEPH L. FIRM, OF CHICAGO, ILLINOIS, ASSIGNOR TO THE GOSS PRINTING PRESS COMPANY, OF CHICAGO, ILLINOIS.

PRINTING-PRESS.

SPECIFICATION forming part of Reissued Letters Patent No. 12,051, dated November 4, 1902.

Original No. 704,624, dated July 15, 1902. Application for reissue filed October 3, 1902. Serial No. 125,851.

*To all whom it may concern:*

Be it known that I, JOSEPH L. FIRM, a citizen of the United States, and a resident of the city of Chicago, in the county of Cook and State of Illinois, have invented a new and Improved Printing-Press, of which the following is a full, clear, and exact description.

My invention relates to improvements in rotary printing-presses designed to better adapt them to do fine work, such as magazine and similar printing where illustrations are used, and in general to do a better grade of work than is usually executed upon rotary presses.

My invention also relates to improvements in the folding mechanism by which, among other results, offsetting or smutting of the product is prevented during the process of folding.

My invention comprises the novel features which will be hereinafter particularly pointed out in the claims.

Figures 1, 8:
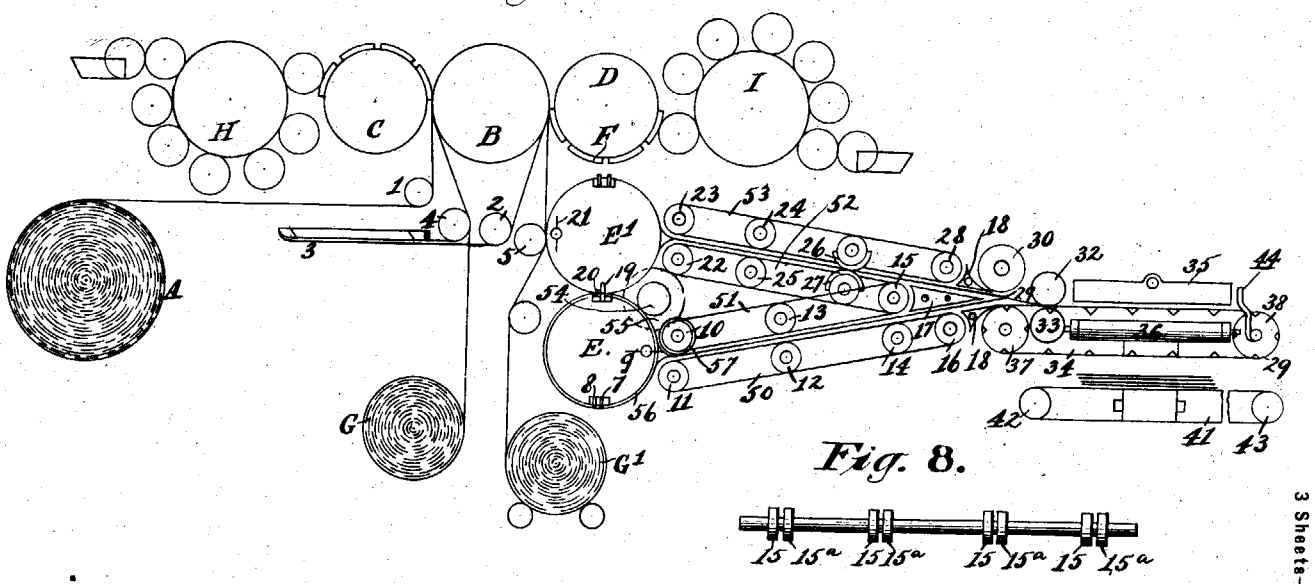
Figures 2, 3, 4, 5, 6:
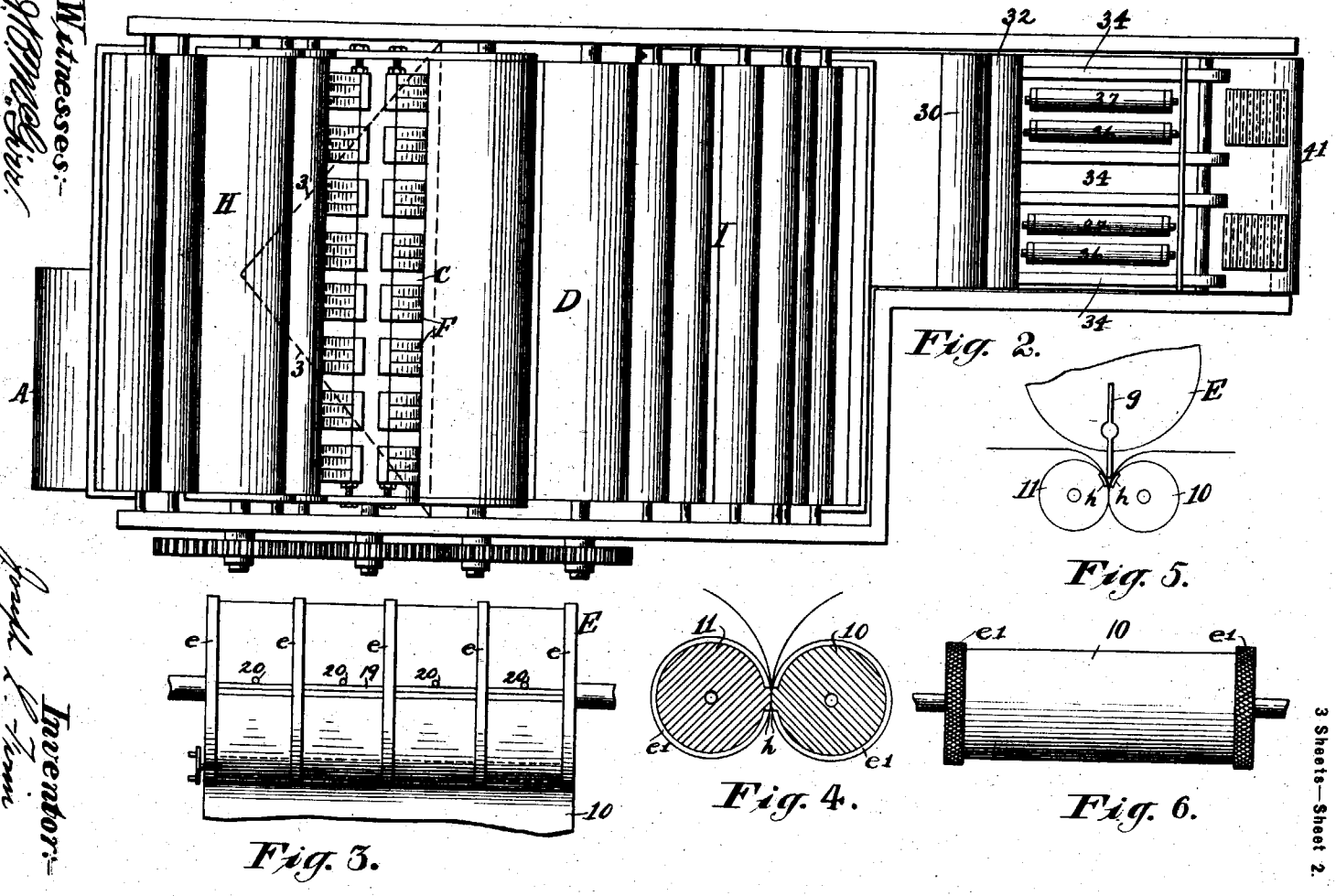
Figure 7:
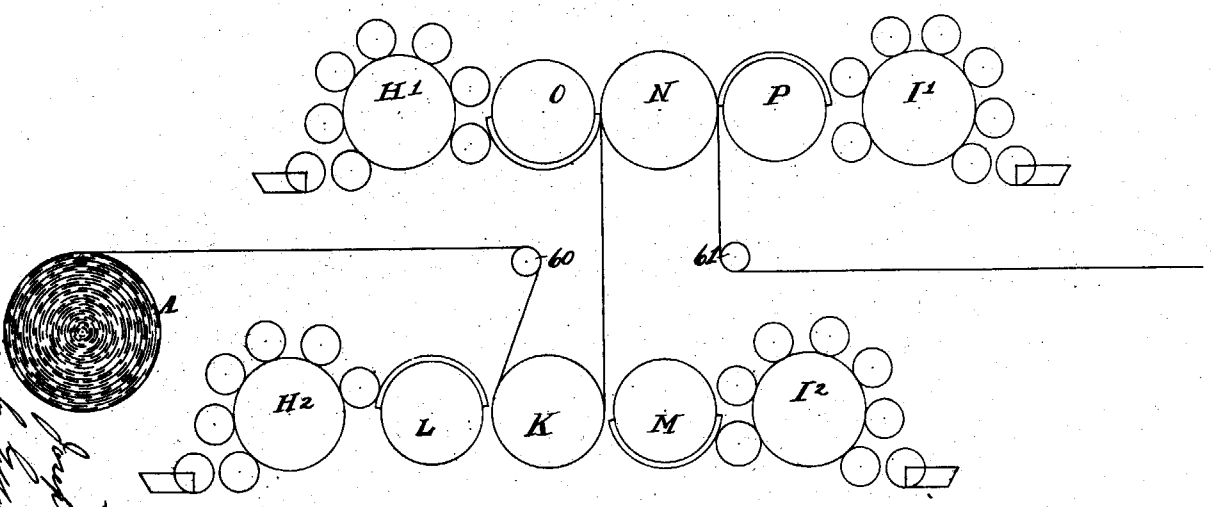

Figure 1 is a side elevation of my improved press. Fig. 2 is a plan thereof. Fig. 3 is a detail side view of one of the rotary carriers and its attached cutting mechanism. Fig. 4 is a cross-section of two of the folding-rollers which receive the sheets from the folding-carrier. Fig. 5 is an end view of one of the folding-carriers and the folding-rollers which receive the papers therefrom. Fig. 6 is an elevation of one of the folding-rollers, and Fig. 7 is a side elevation of a modified arrangement of printing-cylinders. Fig. 8 shows the shaft and two sets of rollers which carry the tapes of both delivering mechanisms.

The form-cylinders C D shown herein carry forms F, which cover only half the surface of the cylinder, said forms being shown as arranged adjacent each other, one half or side of the cylinder being covered by the forms, while the opposite side is blank. The forms necessary for printing one side of the web are located one half upon the cylinder C and the other half upon the cylinder D. The forms upon one cylinder are so located with reference to the forms upon the other cylinder as to print in the spaces left blank by the forms of the other cylinder. Both these form-cylinders coöperate with a common impression-cylinder B, which lies between them, while inking mechanisms H and I engage, respectively, the form-cylinders C and D.

The web A is of a width equal to half the length of the form and impression cylinders and is printed upon one side by the forms on one end of the cylinders and is then turned and presented to the forms at the other end of the cylinders for printing the other side. The web upon leaving the roll is conducted about the roller 1, the impression-cylinder B, and roller 2 to the turning-bars 3, which reverse the web and shift it to one side into line with the other end of the form-cylinders. It is then led over the roll 4, about the impression-cylinder, and then to the cutting and folding mechanisms. As the web is led to the impression-cylinder for its second passage an offset-web is combined with it, this offset-web appearing as the roll G. After passing about the impression-cylinder with the printed web the offset-web is separated therefrom and wound up as the roll G'.

The carriers E E' each have a cutting-knife, pins, and a folding-blade arranged so that they alternately sever a section of the web and present it to the rollers of a folding apparatus. These parts of the carrier are constructed and operate like the similar parts in carriers of the ordinary and well-known sort, except as hereinafter pointed out, and particular description thereof is deemed unnecessary. I have herein shown only two such carriers, as that number will accomplish my present purpose. It is, however, evident that more such carriers might be employed, if desired, the novelty lying in the employment of a plurality of such carriers, each of which in turn receives the sections successively cut from the web.

The knife 8 of the carrier E enters a corresponding groove in the carrier E', and the pins 7 engage the edge of the paper to convey the paper about the carrier E. When the carriers have made a half-turn, the knife 19 upon the other carrier cuts the web, and the folding-blade 9 presents the section cut off to the folding-rollers 10 11.

When the knife 19 cuts the web, the pins 20 engage the web to convey it about the carrier E' until a half-revolution is made, when the knife 8 of the other carrier severs another section, which is presented by the blade 21 to the folding-rollers 22 23. The two carriers thus alternate in presenting sections of the web to their respective folding mechanisms.

About the folding-rollers 11 and 10, respectively, pass series of carrier belts or tapes 50 and 51, which are located so as to engage the paper only in the marginal spaces between the pages, the belts 50 also passing about rollers or pulleys 12, 14, and 16, while the belts 51 pass about rollers or pulleys 13 and 15. Carrier-belts 52 pass about the rollers or pulleys 22, 25, 27, and rollers 15ª, corresponding with rollers 15. Carrier-belts 53 pass about rollers or pulleys 23, 24, 26, and 28. The tapes or belts 51 and 52 are offset sufficiently as to not interfere with each other, and the rollers or pulleys 15 and 15ª are correspondingly separated lengthwise of the shaft, as clearly shown in Fig. 8. The two sets of rollers are capable of turning independently of each other, as by having one or both sets loose upon the shaft, whereby they are enabled to turn in opposite directions, as is required for the proper operation of the device. The two sets of carrier-belts lead from their respective carriers to a common point, delivering their folded sections to a common set of rollers 30 and 31. A guide 17 is placed between the courses of the two sections of papers where they converge and two other guides 18 at each side of said apex to properly guide the paper sections to the rollers 30 and 31.

A gripper-belt 34 passes about rollers 31 and 38 and carries grippers 29. By these grippers the paper sections are conveyed above the rollers 36 and 37, between which they are passed by the action of the folding-blades 35, which are reciprocated above the line between said rollers. The folded signatures are then delivered to the apron 41. The signatures are accurately located above the rollers 36 37 by contacting with a stop 44.

The two sets of carrier-belts are run at different speeds, so that the section of the web which is delivered to one will be superposed on the section which was delivered to the other, thus doubling the size of the signature when completed. This variation of speed may be secured by any well-known means. The means shown consists of wheels 54 55, secured together, wheel 54 driven by direct engagement with wheel 56, turning with the cylinder E, and wheel 54 turning wheel 22 of the upper or accelerating set of tapes, while wheel 56 directly drives wheel 10 of the lower tapes by engaging a wheel 57, turning therewith. The upper set, consisting of the carrier-belts 52 53, are herein intended to run at a speed in excess of the other or lower set, thus delivering its section of the web to the rollers 30 31 at the same time as that coming from the lower carrier E. The rollers 26 and 27 have ribs projecting therefrom and adapted to engage the folded paper in its passage to give it an additional acceleration, if needed, to secure proper registry with the other section. These rollers may be adjusted to cause more or less acceleration, as desired. 32 and 33 represent slitters, by which the sections are slit longitudinally.

The carriers E and E′ and the rollers over which the carrier-belts pass are of a peculiar construction, as shown in Figs. 3, 4, and 6. The carrier, as shown in Fig. 3, consists of a cylinder which has circumferential ribs or projecting bands *e* so located as to engage the web only on the line of the marginal spaces between pages, thus avoiding all contact with the printed surfaces and preventing smutting the printed matter.

The folding-rollers are similarly constructed, as shown in Figs. 4 and 6. In many cases at least it will be sufficient in their case to omit the intermediate ribs and use only ribs at the ends of the rollers, as shown in Fig. 6. At the point where the folding-rollers engage the paper to fold it they are provided with longitudinal ribs *h*, as shown in Fig. 4, which also engage the paper at the marginal blank space between pages.

By the above construction of the rollers the paper does not come in contact with the rollers except on the page margins and is therefore not smutted thereby, and the effect of an offset-web is obtained without using an offset-web.

In Fig. 7 a different arrangement of the printing mechanisms is shown, the turning-bars being omitted and an upper and lower deck employed. In this figure the forms F′ are shown as extending half-way around the form-cylinders L, M, O, and P. The web after printing is to be conveyed to a folding mechanism similar to that described and illustrated in Fig. 1.

Having thus fully described my invention, I claim as new and desire to secure by Letters Patent—

1. A printing-press having an impression-cylinder and a pair of form-cylinders of the same diameter as the impression-cylinder for printing one side of a web, each form-cylinder having forms secured thereto to cover longitudinal sections thereof comprising substantially half the surface of the cylinder, the forms of each form-cylinder being adapted to print upon the space left blank by the forms of the other form-cylinder.

2. A printing-press having a single impression-cylinder and two form-cylinders of the same diameter as the impression-cylinder for printing one side of a web, each of said form-cylinders having forms covering a longitudinal belt extending half about the cylinder, the two form-cylinders being timed to print on alternate sections of the web.

3. A printing-press having a single impression-cylinder and two form-cylinders placed on opposite sides thereof, forms arranged on each of said cylinders to print one-half only of the web, the forms of one cylinder printing in the spaces not printed by the other cylinder, means for presenting a half-width web to one end of the impression and form cylinders to print one side thereof, and means for turning and presenting the web to the other end of the said cylinders to print the other side thereof.

4. In a printing-press the combination with means for perfecting a web, of a plurality of carriers adapted to each receive in turn the successive sections of the web, a folding and conveying mechanism for each carrier, said conveying mechanisms all leading to and delivering their web-sections at a common point and being speeded to deliver the sections of each series synchronously and superposed.

5. In a printing-press the combination with means for perfecting a web, of two rotary carriers adapted to receive the web between them and provided with web-cutting mechanisms, means whereby successive signatures are taken alternately by said carriers, two folding and conveying mechanisms receiving the signatures each from its respective carrier and delivering them to a common point, and means for driving one of said conveying mechanisms at a speed in excess of the other whereby the signature from one conveyer is delivered superposed on the other to form a single product.

6. In a printing-press the combination with means for perfecting a web, of two rotary carriers adapted to receive the web between them and provided with web-cutting mechanisms, means whereby successive signatures are taken alternately by said carriers, a set of folding-rollers for each carrier adapted to receive the signatures therefrom, conveyers leading from said folding-rollers to a common delivery-point, and means for accelerating the passage of the signature through one conveyer whereby the signatures from both conveyers may be superposed to form a single product.

7. In a printing-press the combination with means for perfecting a web, of a plurality of primary folding mechanisms adapted to receive in turn the successive sections of the web, secondary folding mechanisms and means for simultaneously delivering in superposed position web-sections from all of the primary folding mechanisms to the secondary folding mechanisms to form a single product.

8. A paper-folding device comprising two rotary carriers having coöperating web-cutting members adapted to sever the web into semicircumferential sections or sheets, each carrier having sheet-holding and sheet-folding means, said carriers being timed so that the sheet-holding and sheet-folding means of the respective carriers alternately engage the successive semicircumferential web sections or sheets.

9. A paper-folding device comprising two rotary carriers having coöperating web-cutting members adapted to sever the web into semicircumferential sections or sheets, each carrier having sheet-holding means adjacent one of its cutting members, said carriers being timed so that the sheet-holding means of the respective carriers engage alternate sheets, a folding-blade upon each carrier located ninety degrees behind the sheet-holding means of the same carrier and folding-rolls receiving the sheets from said folding-blades.

10. In a printing-press the combination with two rollers adapted to receive the perfected web between them, and cutting mechanisms acting twice for each revolution of said rollers, of web retaining and folding mechanisms carried by said rollers and engaging alternate web-sections.

In testimony whereof I have signed my name to this specification in the presence of two subscribing witnesses.

JOSEPH L. FIRM.

Witnesses:
CHAS. PETTIGREW,
GEO. A. EDDY.